US007631663B2

(12) United States Patent
Rauch et al.

(10) Patent No.: US 7,631,663 B2

(45) Date of Patent: Dec. 15, 2009

(54) PILOT VALVE

(75) Inventors: Johannes Rauch, Neuendorf (DE); Matthias Rustler, Lohr (DE)

(73) Assignee: Bosch Rexroth AG, Stuttgart (DE)

( * ) Notice: Subject to any disclaimer, the term of this patent is extended or adjusted under 35 U.S.C. 154(b) by 544 days.

(21) Appl. No.: 11/573,331

(22) PCT Filed: Aug. 2, 2005

(86) PCT No.: PCT/EP2005/008368

§ 371 (c)(1), (2), (4) Date: Feb. 6, 2007

(87) PCT Pub. No.: WO2006/015771

PCT Pub. Date: Feb. 16, 2006

(65) Prior Publication Data

US 2007/0215222 A1 Sep. 20, 2007

(30) Foreign Application Priority Data

Aug. 6, 2004 (DE) ...................... 10 2004 038 380

(51) Int. Cl.
*F15B 13/043* (2006.01)
*F16K 31/143* (2006.01)

(52) U.S. Cl. ............................ 137/625.62; 251/129.03

(58) Field of Classification Search .................. 137/82, 137/83, 625.61, 625.62; 251/14, 129.03
See application file for complete search history.

(56) References Cited

U.S. PATENT DOCUMENTS

| | | | | |
|---|---|---|---|---|
| 2,797,666 | A * | 7/1957 | Chubbuck | 137/625.62 |
| 2,836,154 | A * | 5/1958 | Lantz | 137/625.62 |
| 2,886,009 | A * | 5/1959 | Myer | 137/625.62 |
| 2,924,241 | A * | 2/1960 | Bauer | 137/625.62 |
| 2,950,703 | A * | 8/1960 | Fletcher | 137/625.62 |
| 3,029,830 | A * | 4/1962 | Klover et al. | 137/82 |

(Continued)

FOREIGN PATENT DOCUMENTS

DE 2532668 2/1977

(Continued)

OTHER PUBLICATIONS

Ewald, R., et al.,"Proportional-und Servoventil-Technik", Brochure No. RD 00291, Dec. 1989.

(Continued)

*Primary Examiner*—John Rivell
(74) *Attorney, Agent, or Firm*—Boyle Fredrickson, S.C.

(57) ABSTRACT

There is disclosed a pilot valve, especially for a servo valve, comprising an actuating motor and a hydraulic preamplifier via which a control pressure difference can be created that acts upon a main slide of a main stage. According to the invention, a blocking mechanism is embodied in the flow path of the control oil. A control duct that is connected, either directly or via a branch, to a control chamber of the main stage can be blocked by manually actuating said blocking mechanism, while the other control duct remains open. The other control duct can be blocked by actuating the blocking mechanism in the opposite direction while the first control duct remains open. A control pressure difference by means of which the main slide can be displaced into a predetermined position can be created manually by actuating said blocking mechanism.

17 Claims, 5 Drawing Sheets

U.S. PATENT DOCUMENTS

| | | | | | |
|---|---|---|---|---|---|
| 3,220,428 | A | | 11/1965 | Wilkerson | |
| 3,552,433 | A | * | 1/1971 | Mason | 137/625.62 |
| 3,554,211 | A | * | 1/1971 | Bernstein | 137/625.62 |
| 3,712,339 | A | * | 1/1973 | Bartholomaus et al. | 137/625.62 |
| 3,759,485 | A | | 9/1973 | Mills | |
| 3,899,002 | A | * | 8/1975 | Hayner | 137/625.62 |
| 4,137,825 | A | * | 2/1979 | Leonard | 137/625.62 |

FOREIGN PATENT DOCUMENTS

| | | | |
|---|---|---|---|
| DE | 3627425 | A1 | 2/1988 |
| DE | 40 32 811 | A1 | 4/1992 |
| DE | 102004038380.4 | | 12/2004 |

OTHER PUBLICATIONS

Moog, "Servoverstellgerate mit mechanischer Betatigung", Brochure No. D062-900, Jul. 1998.

* cited by examiner

PILOT VALVE

BACKGROUND OF THE INVENTION

1. Field of the Invention

The invention relates to a pilot valve, especially for servo valves.

2. Description of Related Art

In electro-hydraulic servo valves the hydraulic output (fluid flow or pressure) is proportional to the electrical input signal. In the case of larger pressure fluid volume flows, usually, two-stage servo valves are employed in which a main stage is adjusted via a hydraulic pilot stage. Such a two-stage servo valve is distributed by the applicant, for instance, under the product name 4WS.2DM. The pilot stage substantially consists of a control motor by means of which the position of a bounce plate is variable between two control nozzles. By approximation of the bounce plate to one of the control nozzles a control oil flow is reduced by the latter, while the control oil flow is increased by the other control nozzle. In the flow path of the control oil to each nozzle a respective diaphragm is arranged so that also the pressure drop is appropriately reduced or increased via the respective diaphragms by varying the control oil volume flow.

The pressure adjusting downstream of the diaphragms is tapped off by means of a control duct and guided to control surfaces pressurizing a main slide of a main stage on the front side so that the main slide is displaced into a control position in response to the pressure difference occurring. The bounce plate and the control nozzles thus act as hydraulic booster by means of which the displacement of position caused by the control of the actuating motor is converted to a pressure difference.

In some applications it is necessary, for instance when taking the system into operation in accident (emergency stop) or in troubleshooting, to put the servo pilot valve manually into a predetermined position so that the main slide is appropriately adjusted and the system is switched to be pressureless or the like.

Servo adjusting systems are offered by Moog under the designation D062-900 in which the mechanical emergency actuation is effected by a lever disposed at a cap of the servo valve enclosing the actuating motor and acting directly upon the actuating motor.

It is a drawback of said solution that in the case of violent operation of the lever the actuating motor can be damaged and that the lever mimic is also relatively sensitive to pollution and vibrations of the system.

Compared to this, the object underlying the invention is to provide a pilot valve, especially for a servo valve, which has an elegant design while permitting a reliable manual operation.

SUMMARY OF THE INVENTION

The preferred embodiments are directed to a pilot valve including an actuating motor and a hydraulic preamplifier that includes a bounce plate disposed between two control nozzles and is movable by the actuating motor. A control oil volume flow guided via a respective nozzle duct and an inlet diaphragm to the control nozzles is variable by varying the distance of the bounce plate from the control nozzle and wherein the two nozzle ducts branch off a pressure terminal (P') guiding a supply pressure of a main stage and downstream of the inlet diaphragms a respective control duct branching off the nozzle ducts is connected to a respective control terminal A', B' to which the control chambers of a main stage can be connected. The pilot valve also includes a manual actuation by which a control pressure difference can be applied to the control terminals A', B' independently of the control of the actuating motor, characterized by a manually actuated blocking mechanism by means of which one of the nozzle ducts can be closed.

In accordance with the invention, the pilot valve is designed to have a manually operable blocking mechanism by which at least one of those nozzle ducts can be closed by control through which control oil is guided to control nozzles between which a bounce plate or the like of the pilot valve is disposed. By operating said blocking mechanism the control oil volume flow to a control nozzle is blocked and thus a pressure drop is generated by which the directional control valve is brought into its desired position to be adopted in the case of "emergency stop" or for maintenance purposes.

Such an actuating means integrated in a hydraulic preamplifier of the pilot valve requires no direct access to the servo motor so that said sensitive component is protected against damage. Moreover, such a blocking mechanism can be integrated in the servo valve with a minimum expenditure on apparatuses so that the latter can have a very compact design without any protruding components such as, for instance, the levers in prior art.

In an especially preferred embodiment the blocking mechanism comprises a double-acting piston upon actuation of which a nozzle duct leading to a control nozzle can be closed, while the nozzle duct leading to the other control nozzle remains open. I.e. depending on the actuating direction the control oil volume flow to the one control nozzle or to the other control nozzle can be interrupted so as to adjust the main stage either in the one direction or in the other direction.

It is particularly preferred when the piston is a rotary piston which is rotatably disposed in a housing of the pilot valve.

The piston preferably includes at its outer circumference two recesses which in a home position of the piston release a nozzle duct flow cross-section and which in a locking position of the rotary piston close the cross-section of a nozzle duct by a control edge delimited by the recess, while the flow cross-section of the other nozzle duct remains substantially unchanged. When rotating the piston in the opposite direction, the other nozzle duct is correspondingly closed and the first-mentioned nozzle duct remains in its open position.

The servo valve has an especially compact design when the piston and the piston bore receiving the same form part of the control oil flow path so that complex additional duct bores can be dispensed with.

The piston is preferably biased by means of one or more reset springs into its home position in which both control oil cross-sections are opened. In an especially preferred embodiment a spring-biased reset bolt immerses in a radial recess of the rotary piston so that the latter can be rotated against the force of the reset spring and upon release is returned into its home position again.

The pilot valve according to the invention preferably comprises an electric return of the bounce plate which arranges for the bounce plate to be returned into a central position between the control nozzles upon reaching the predetermined control position.

The housing of the pilot valve can have an especially compact design when the piston and the nozzle member forming the control nozzles are arranged to be axially in parallel to each other.

Other advantageous further developments of the invention are the subject matter of further subclaims.

BRIEF DESCRIPTION OF THE DRAWINGS

Hereinafter a preferred embodiment of the invention is illustrated in detail by way of schematic drawings, in which.

DETAILED DESCRIPTION OF THE PREFERRED EMBODIMENT

Figure 1:
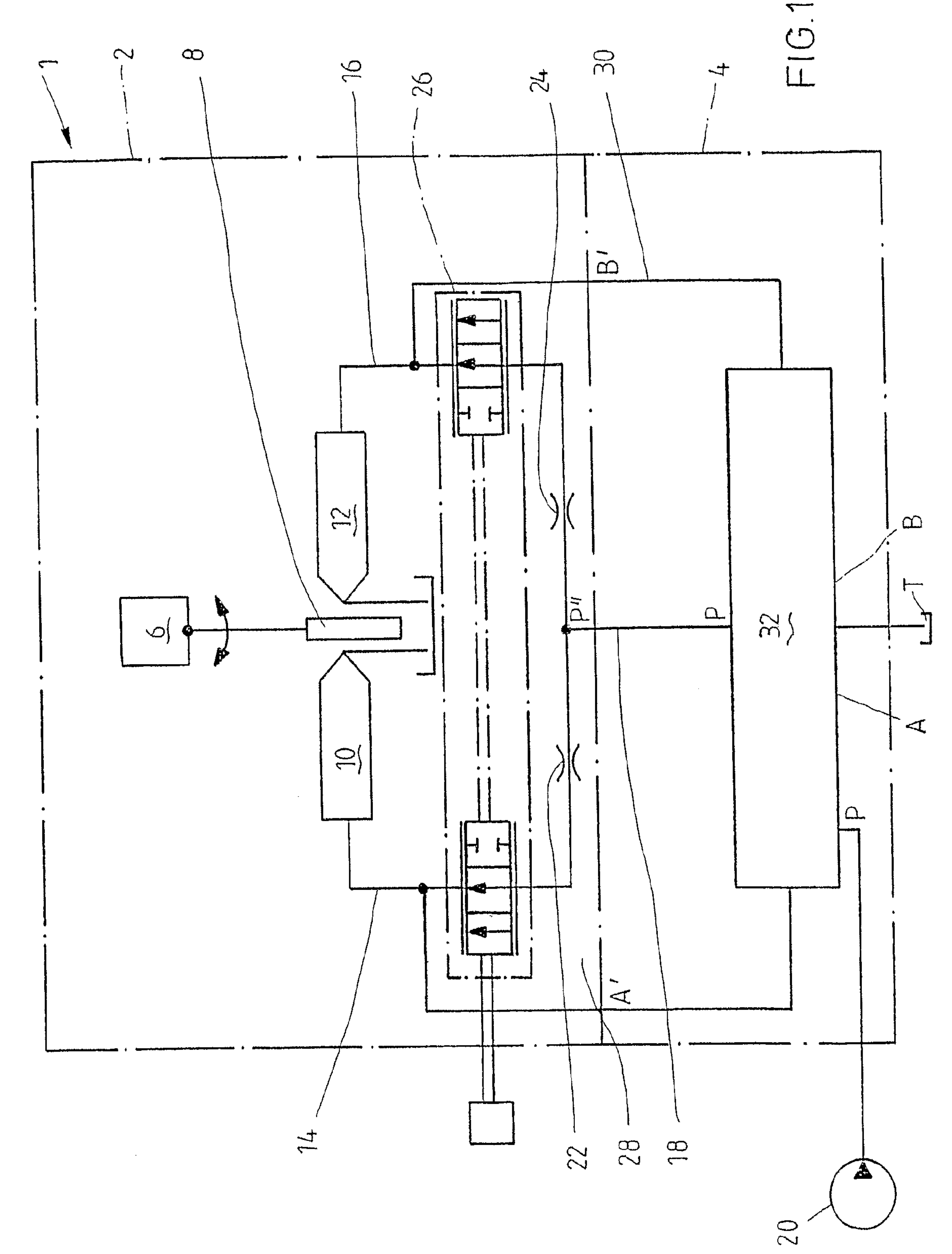
FIG. 1 shows a schematic representation of a servo valve comprising a servo pilot valve according to the invention.

FIG. 1 shows the schematic structure of a two-stage servo valve 1 substantially comprising a pilot stage 2 and a main stage 4.

The pilot stage includes an actuating motor 6 by which a bounce plate 8 of a hydraulic preamplifier is movable. The bounce plate 8 is arranged between two control nozzles 10, 12 which are connected by means of a respective nozzle duct 14 and 16 to a pressure terminal P' of the pilot stage 2. Said pressure terminal P' is connected to a pressure line 18 which is supplied with pressure fluid via a pump 20. In each of the two nozzle ducts 14, 16 a respective inlet diaphragm 22, 24 is provided to which a blocking mechanism 26 is allocated. The latter is designed such that in its shown home position it is arranged in a through position in which the control oil branched off the pressure line 18 can flow through the nozzle ducts 14, 16. By manual actuation of the blocking mechanism 26 either the nozzle duct 14 or the nozzle duct 16 can be blocked, the respective other nozzle duct 16 or 14 remains opened. That is to say, depending on the actuating direction one of the nozzle ducts 14, 16 is blocked, the control oil can flow through the other one.

A respective control line 28 or 30 leading to the terminals A' and B' of the pilot stage 2 and from there to the control chambers of a valve slide 32 of the main stage 4 branches off the two nozzle ducts 14, 16. Thus, the valve slide 32 is displaced into a control position in response to the control pressure difference in the two control lines 28, 30.

In the home position of the blocking mechanism 26 the control oil flows from the pressure terminal P' of the pilot stage 2 via the two nozzle ducts 14, 16 and the opened blocking mechanism 26 to the two control nozzles 10, 12 and from there against the bounce plate 8 and back into the tank T. As long as the bounce plate 8 is in its central position, the control oil volume flow is equal by means of the two control nozzles 10, 12 and, correspondingly, the pressure drop above the two inlet diaphragms 22, 24 is equal so that the same control pressure is prevailing at the control chambers of the valve slide 32 of the main stage 4—the valve slide 32 remains in its home position.

For adjusting the control position, the actuating motor 6 is controlled by a not represented control so that the bounce plate 8 is swiveled and approaches one of the control nozzles 10, 12. In this way, the control oil volume flow is reduced via the respective nozzle—for instance the control nozzle 10—so that the pressure difference above the allocated control diaphragm 22 is reduced. At the same time, the control oil volume flow increases via the other control nozzle 12 so that the pressure drop above the allocated inlet nozzle 24 is increased—the control pressure difference tapped off by means of the control ducts 28, 30 varies so that the valve slide 32 is displaced into an appropriate control position. By an electric feedback the axial displacement of the valve slide 32 resulting therefrom is detected and, upon reaching the predetermined desired value, the bounce plate is returned to its central position by an appropriate control of the actuating motor 6 so that the valve slide 32 remains in the desired control position.

The manually operable blocking mechanism 26 permits to operate the blocking mechanism 26 in the case of emergency or for maintenance purposes such that one of the nozzle ducts 14, 16 is blocked so that a control pressure difference is generated which displaces the valve slide 32 into a predetermined end position. The bounce plate 8 does not remain in its central position, because it is approached on one side only and, correspondingly, swivels in the direction of the blocked control nozzle 12 (when the actuating motor 6 is not operated). Accordingly, the control oil volume flow increases via the other control nozzle 10 and thus also the pressure drop above the allocated inlet diaphragm 22 is increased so that the pressure difference acting upon the valve slide 32 is somewhat lowered—however, the valve slide is nevertheless displaced into the predetermined end position provided for maintenance or for emergency shut-down.

Figure 2:
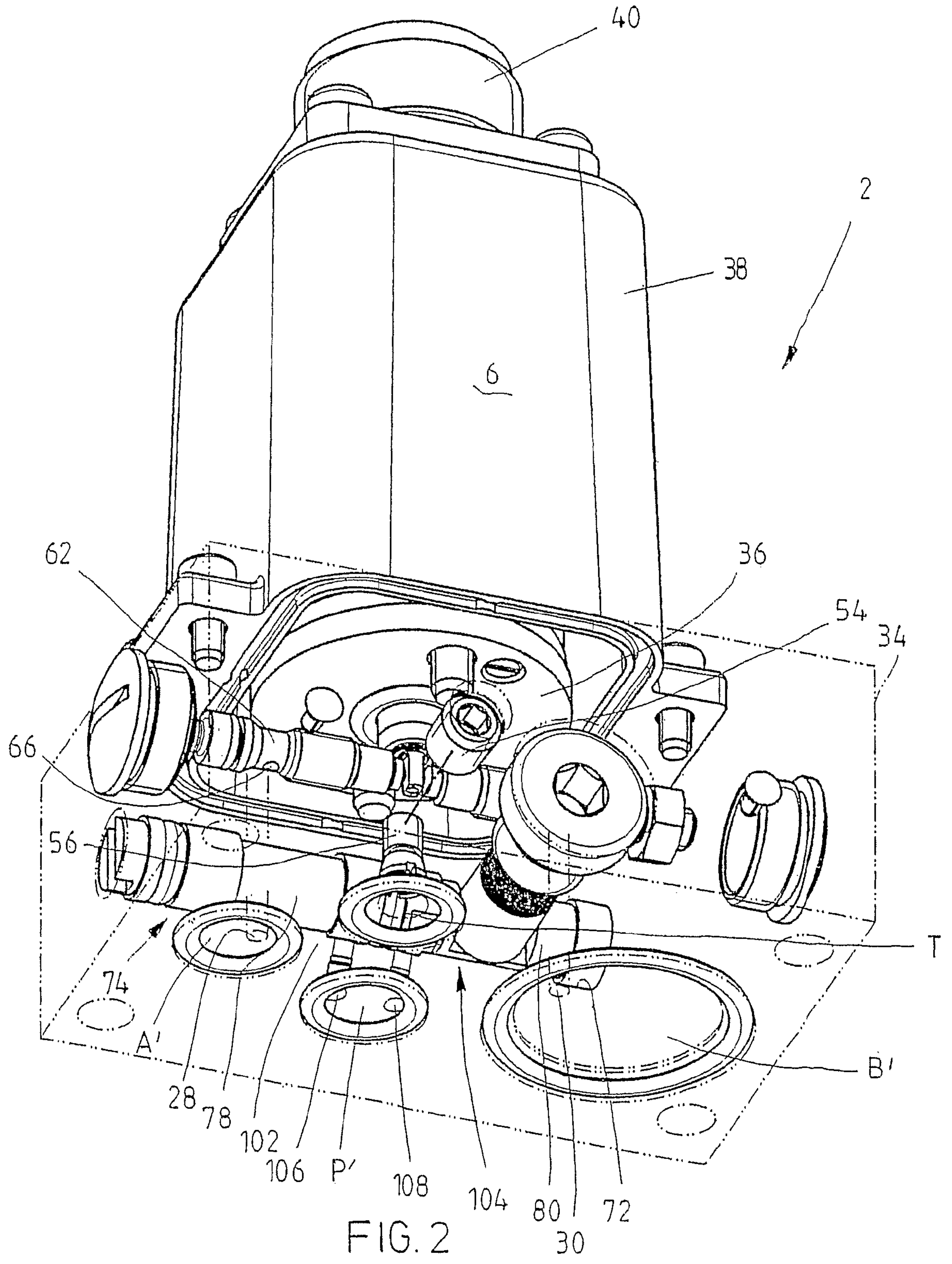
FIG. 2 shows a three-dimensional representation of a concrete embodiment of a servo pilot valve.

The FIGS. 2 to 6 show details of a concrete embodiment of a pilot stage 2 as it is applicable in a servo valve according to FIG. 1. FIG. 2 shows a three-dimensional representation of said concrete embodiment of a pilot stage 2. The latter has an approximately rectangular housing 34 to which the actuating motor 6—for instance a torque motor—is screwed by means of a mounting flange 36. As one can take especially from the cut side view according to FIG. 3, the torque motor 6 is enclosed by a motor housing 38 at which the power supply and the signal terminals 40 are formed. According to FIG. 3, the mounting flange 36 immerses in a bounce plate bore 42 with a hub-type projection. The bounce plate 8 which is mounted on an armature 44 of the actuating motor 6 extends through said hub-type projection. The mounting flange 36 including the hub-type projection forms an elastic spring tube which admits a deflection of the bounce plate 8 transversely to the plane of projection in FIG. 3. The lower end portion of the bounce plate 8 in FIG. 3 immerses across the hub-type projection of the mounting flange 36 into a bounce plate bore 46 in the form of a blind hole. In a nozzle bore 56 arranged transversely thereto two nozzle members 48 are accommodated to be exchangeable. Said nozzle members 48 are biased via mounting screws 50 against a respective radial shoulder of the nozzle bore 56. A respective one of said control nozzles 10, 12 is formed at the respective end portion of the nozzle members 48, 50 allocated to bounce plate 8.

Said control nozzles 10, 12 are connected by control passages hereinafter described in detail to the pressure terminal P' which is formed at the large surface of the housing 34 distant from the actuating motor 6. The closed end portion of the bounce plate bore 42 is connected by means of a tank duct 56 indicated in the cut side view according to FIG. 4 and also in FIG. 2 and a closed transverse bore 58 to the tank terminal T. In the view according to FIG. 2, the transverse bore 58 is indicated merely by a broken line, what is visible is the plug 54 inserted in said transverse bore 58.

Figure 3:
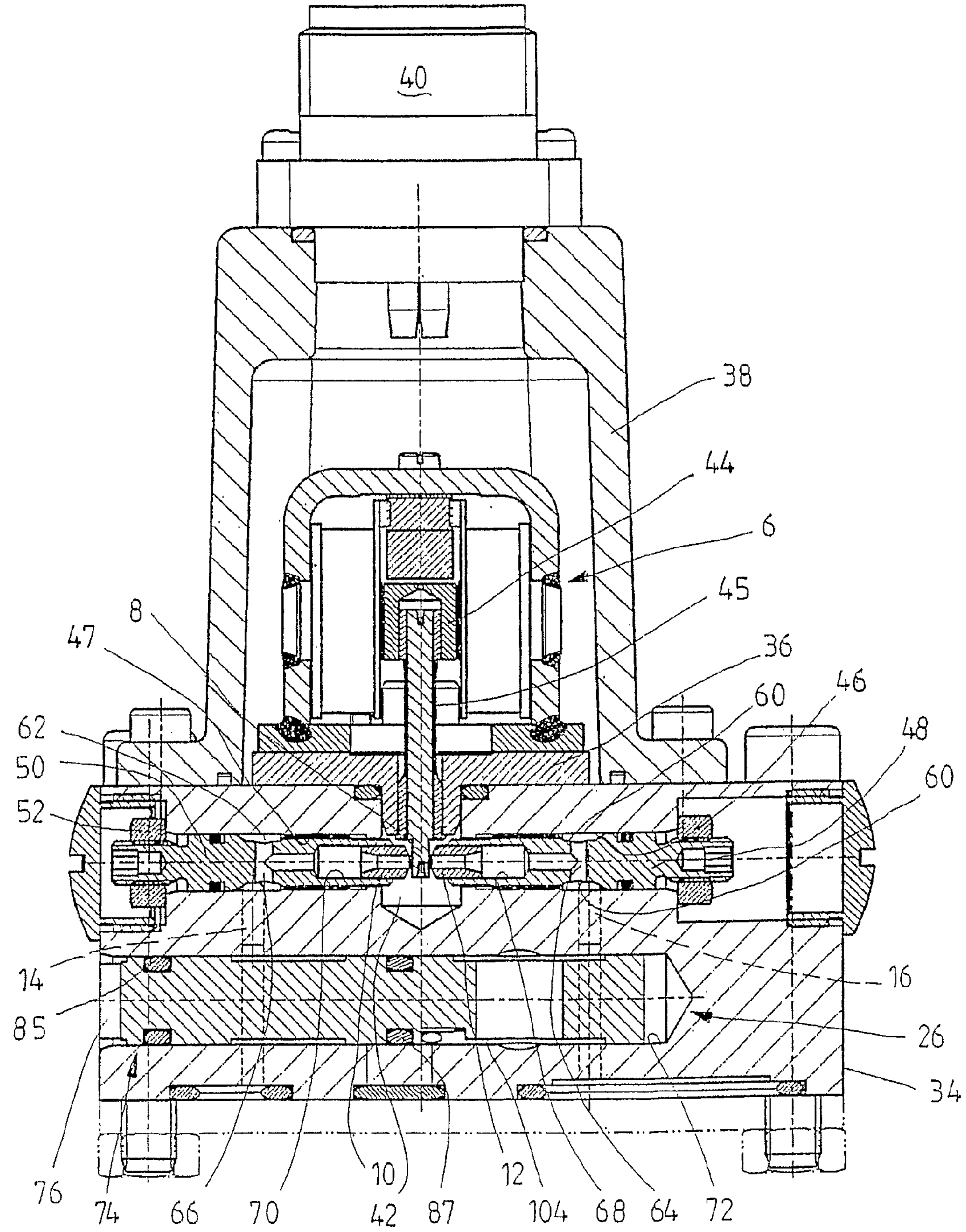
FIG. 3 is a cut front view of the servo pilot valve from FIG. 2.
Figure 4:
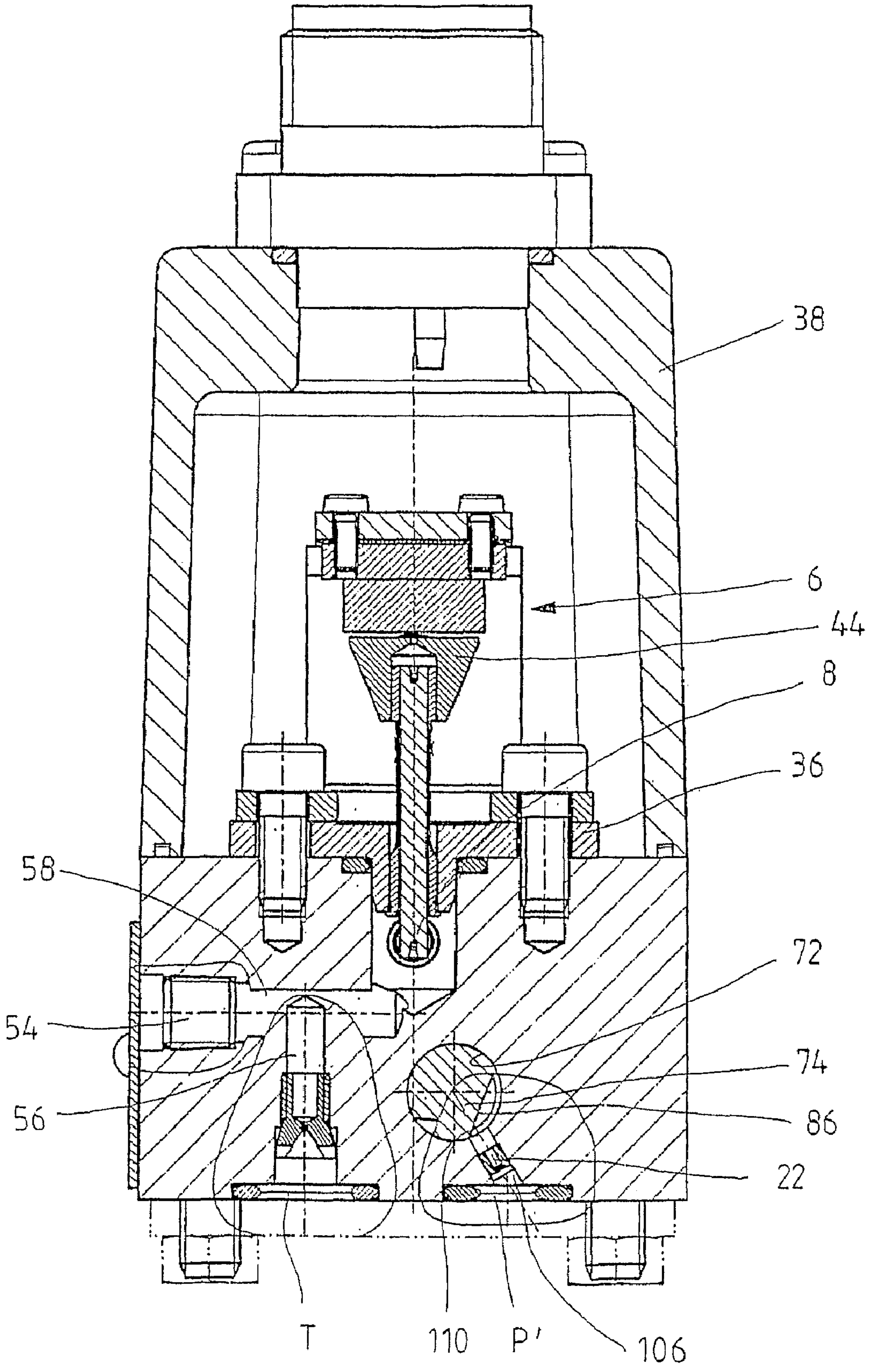
FIG. 4 is a cut side view of the servo valve from FIG. 2.

In accordance with FIGS. 2 and 3, at the outer circumference of each of the nozzle members 48, 50 a respective circumferential groove 60, 62 is formed in which transverse bores 64, 66 of a nozzle bore 68, 70 of the nozzle members 48 and 50, resp., open. The annular chambers constituted by the circumferential grooves 60, 62 and the circumferential wall of the transverse bore 58 are connected through the nozzles ducts 14, 16 merely indicated in FIGS. 2 and 3 to a piston bore 72 in which a rotary piston 74 is rotatably supported. The piston bore 72 is a blind bore and the end portion of the rotary piston 74 on the left in FIG. 3 and FIG. 5 terminates with the left front wall of the housing 34. In or at said end portion a hexagon socket 76 or a handle is formed by which the rotary piston 74 is manually rotatable. The section A-A shown in FIG. 3 extends according to the line of cut of FIG. 4 in a stepped manner—accordingly the rotary piston 74 is arranged laterally offset (FIG. 4) with respect to the two coaxially disposed nozzle members 48, 50.

Figure 5:
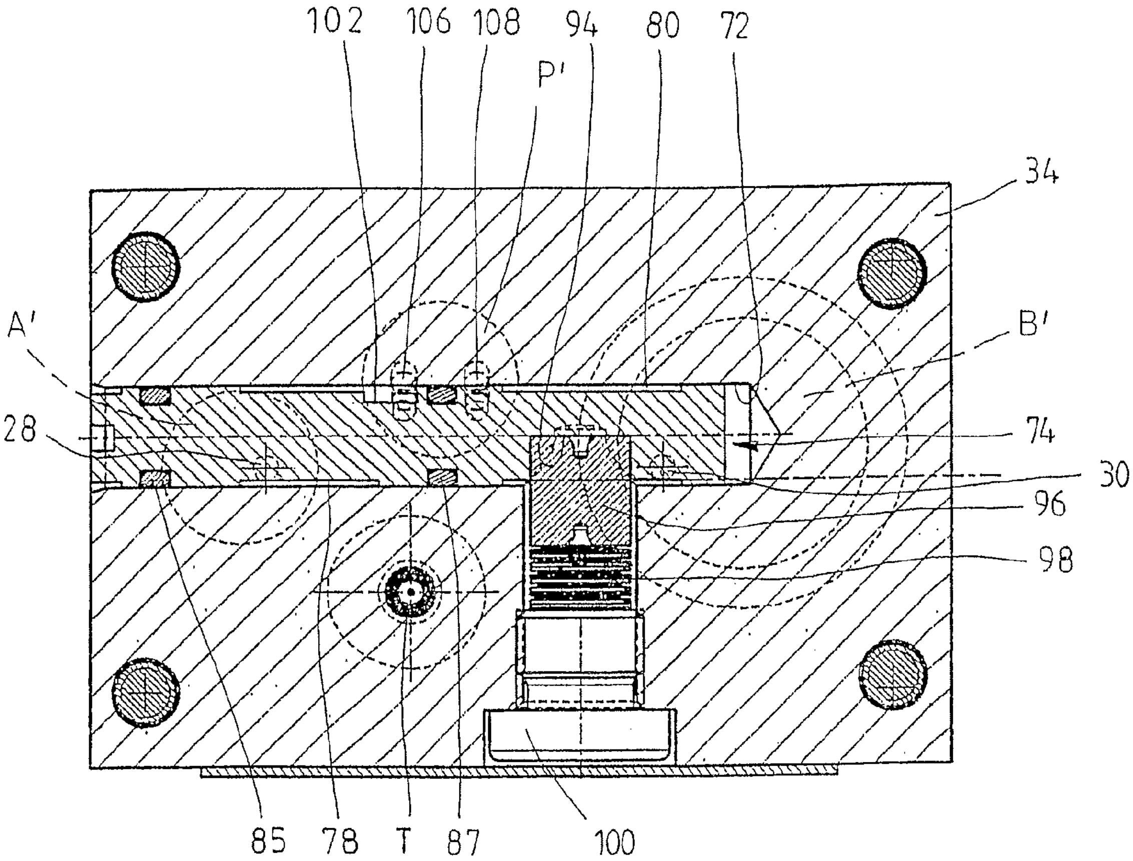
FIG. 5 is a cut top view onto the servo valve from FIG. 2.
Figure 6:
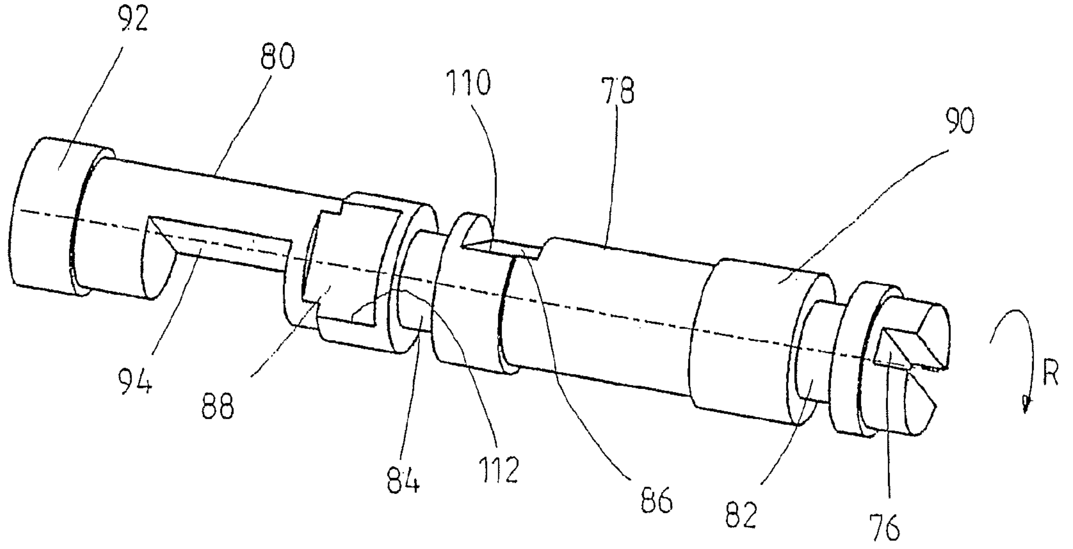
FIG. 6 is a three-dimensional representation of a rotary piston of the servo valve from FIG. 2.

FIG. 5 shows a section along the line D-D in FIG. 3. The rotary piston 74 per se is represented three-dimensionally in FIG. 6. Accordingly, the rotary piston 74 has two axially relatively elongated annular grooves 78, 80 as well as comparatively narrow but deeper channels 82, 84 one of which is arranged on the left from the annular groove 78 and the other is arranged between the two annular grooves 78, 80. According to FIGS. 3 and 5, sealing rings 85, 87 are inserted in said channels 82, 84. Between the annular groove 78 and the channel 84, on the one hand, and the annular groove 80 and the channel 82, on the other hand, at the outer circumference of the rotary piston 74 two flattened portions 86, 88 are formed which are offset by 75° with respect to each other in the shown embodiment. Said flattened portions 86, 88 are somewhat deeper in the radial direction than the annular grooves 78, 80 and in the axial direction extend into the respective adjacent one. However, between the flattened portions 86, 88 and the channel 84 a sealing land is retained so that there is no hydraulic connection to the central channel 84. At the two end portions of the rotary piston 74 respective annular collars 90, 92 are provided which are adjacent to the inner circumferential wall of the piston bore 72.

Each of the two flattened portions 86, 88 of the rotary piston 74 forms a control edge 110, 112, wherein the control edge 110 of the flattened portion 86 closes the connecting chamber 102 by a rotation of the rotary piston 74 in the arrow direction R, while the control edge 112 of the flattened portion 88 closes the connecting chamber 104 by rotation in the opposite direction. Said rotation is performed against the resetting moment which is transmitted from the spring-biased reset bolt 96 to the rotary piston 74. The spring deflection of the reset bolt 96 and the force of the spring 98 are chosen such that the rotary piston 74 can be rotated only by a predetermined angle in the direction of rotation R or in the opposite direction. Said angle of rotation is selected such that it is safely prevented that both connecting chambers 102, 104 are blocked. The reset bolt 96 also serves as an axial protection for the rotary piston 74.

In the area of the annular groove 80 a radial groove 94 is formed which extends from the outer circumference of rotary piston 74 to the axis so that the radial groove 94 is delimited by a plane base surface the width of which corresponds to the diameter of the piston land stepped back by the annular groove 80. The side walls are semi-circular and the height corresponds to the radius of said piston land. Of course, also other dimensions can be chosen.

As one can take especially from FIGS. 2 and 5, a reset bolt 96 biased in its engaging position in the radial groove 94 by means of a spring 98 immerses in said radial groove 94. The spring 98 is supported on the rear side at a screw plug 100 screwed in the housing 34. The reset bolt 96 has a circular cross-section whose diameter corresponds to the axial length of the radial groove 94. By the reset bolt 96 the rotary piston 74 is biased into its home position shown in FIGS. 2 to 6 in which the two flattened portions 86, 88 form, jointly with the piston bore 72, respective connecting chambers 102, 104 (cf. FIGS. 2, 3) which are connected to the pressure terminal P' via two nozzle duct bore sections 106, 108 (see FIGS. 2 and 5).

In accordance with FIG. 2, the annular chambers delimited by the two annular grooves 78, 80 and the piston bore 72 are connected to the terminals A' and B' of the pilot stage 2 by means of the bores forming the control ducts 28, 30 (cf. FIG. 2).

During normal operation, i.e. when the rotary piston 74 is not rotated out of its home position shown in FIGS. 2 to 5, the control oil is tapped off via the pressure terminal P' and is guided via the two nozzle duct bore sections 106, 108 as well as the opened connecting chambers 102, 104 into the annular chamber delimited by the annular grooves 78, 80. The nozzle duct bore sections 106, 108 form the inlet diaphragms 22, 24 according to FIG. 1. From said annular chambers the control oil flows via the nozzle ducts 14, 16 in the form of housing bores (cf. FIG. 3) into the annular chambers formed by the circumferential grooves 60, 62 of the nozzle bore 46 and from there via the transverse bores 64, 66 to the control nozzles 10, 12. The control oil then escapes from said two nozzles 10, 12 opposing each other, impinges on both sides of the bounce plate 8 and then flows through the bounce plate bore 42, the transverse bore 54 (FIG. 4) and the tank duct 56 to the tank terminal T and from there back into the tank. Since the control oil flow in both control oil flow paths is equal, the same control pressure is prevailing also in the two control lines 28, 30 and thus in the control chambers of the main stage 4—the valve slide 32 remains in its home position.

The control position then is adjusted in accordance with the remarks on FIG. 1.

In the case of an emergency stop, for maintenance purposes or when starting up the system, the rotary piston 74 is rotated, for instance, in the arrow direction R (FIG. 6) so that the control edge 110 closes the allocated connecting chamber 102 so that the control oil flow path is interrupted from the nozzle duct bore section 106 to the control nozzle 10. Accordingly, a control pressure difference is adjusted at the terminals A', B' which displaces the valve slide 32 into a predetermined emergency stop or maintenance position. Depending on the direction of rotation of the rotary piston 72, two different positions can be adjusted.

The use of the pilot stage 2 according to the invention is not restricted to servo valves, said pilot stage basically could also be used in other applications, for instance in pilot-operated valves or the like. On principle, the solution according to the invention including the blocking mechanism for blocking a control duct could also be mounted in an intermediate plate between a pilot stage and a main stage so that the pertinent valve is manually operable. In this way, an emergency actuation at the magnets of the pilot valve could be dispensed with under certain circumstances. The applicant reserves itself the right to direct a separate independent claim (without bounce plate etc.) to blocking a control duct by a blocking mechanism of a pilot stage. Instead of the electric return also a mechanical or barometric return of the bounce plate 8 may be provided.

There is disclosed a pilot valve, especially for a servo valve, comprising an actuating motor and a hydraulic preamplifier via which a control pressure difference can be created that acts upon a main slide of a main stage. According to the invention, a blocking mechanism is embodied in the flow path of the control oil. A control duct that is connected, either directly or via a branch, to a control chamber of the main stage can be blocked by manually actuating said blocking mechanism, while the other control duct remains open. The other control duct can be blocked by actuating the blocking mechanism in the opposite direction while the first control duct remains open. A control pressure difference by means of which the main slide can be displaced into a predetermined position can be created manually by actuating said blocking mechanism.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

The invention claimed is:

1. A pilot valve comprising:

an actuating motor and a hydraulic preamplifier including a bounce plate disposed between first and second control nozzles and movable by the actuating motor;

corresponding nozzle ducts and inlet diaphragms connected to the first and second control nozzles, respectively, to vary a control oil volume guided by the nozzle ducts and the inlet diaphragms;

wherein the nozzle ducts branch off a pressure terminal guiding a supply pressure of a main stage, and downstream of the inlet diaphragms a respective control duct branching off the nozzle ducts is connected to a respective control terminal to which the control chambers of the main stage are connected; and wherein a control pressure difference is applied to the control terminals independently of the control of the actuating motor using a manually actuated blocking mechanism that closes at least one of the nozzle ducts.

2. A pilot valve according to claim 1, wherein the blocking mechanism comprises a piston upon actuation of which a nozzle duct can be closed and the other nozzle duct remains open.

3. A pilot valve according to claim 2, wherein the piston is a rotary piston.

4. A pilot valve according to claim 2, wherein at its outer circumference the piston includes two recesses releasing a nozzle duct flow cross-section in a home position of the piston, wherein in a blocking position of the piston the flow cross-section of a nozzle duct can be closed by a control edge delimited by a recess, while the control oil flow cross-section of the other nozzle duct remains substantially unchanged.

5. A pilot valve according to claim 4, wherein the recesses are flattened portions which on one side open in annular chambers delimited by a respective annular groove of the piston.

6. A pilot valve according to claim 3, wherein the rotary piston has a radial groove in which a spring-biased reset bolt immerses.

7. A pilot valve according to claim 6, wherein the radial groove extends in radial direction up to the axis of the rotary piston.

8. A pilot valve according to claim 1, wherein the bounce plate includes an electric return.

9. A pilot valve according to claim 2, wherein nozzle members of the control nozzles and the piston are disposed in parallel to each other.

10. A pilot valve comprising:

an actuating motor and a hydraulic preamplifier including a bounce plate disposed between first and second control nozzles and movable by the actuating motor;

first and second nozzle ducts and inlet diaphragms connected to the first and second control nozzles, respectively, to vary a control oil volume guided by the nozzle ducts and inlet diaphragms;

wherein the nozzle ducts branch off a pressure terminal guiding a supply pressure of a main stage and, downstream of the inlet diaphragms, a respective control duct branching off the nozzle ducts is connected to a respective control terminal to which the control chambers of the main stage are connected; and wherein a control pressure difference is applied to the control terminals independently of the control of the actuating motor using a manually actuated blocking mechanism that closes at least one of the nozzle ducts.

11. A pilot valve according to claim 10, wherein the blocking mechanism comprises a piston upon actuation of which a nozzle duct can be closed and the other nozzle duct remains open.

12. A pilot valve according to claim 11, wherein the piston is a rotary piston.

13. A pilot valve according to claim 11, wherein at its outer circumference the piston includes two recesses releasing a nozzle duct flow cross-section in a home position of the piston, wherein a blocking position of the piston the flow cross-section of a nozzle duct can be closed by a control edge delimited by a recess, while the control oil flow cross-section of the other nozzle duct remains substantially unchanged.

14. A pilot valve according to claim 13, wherein the recesses are flattened portions which on one side open in annular chambers delimited by a respective annular groove of the piston.

15. A pilot valve according to claim 12, wherein the rotary piston has a radial groove in which a spring-biased reset bolt immerses.

16. A pilot valve according to claim 10, wherein the bounce plate includes an electric return.

17. A pilot valve according to claim 11, wherein nozzle members of the control nozzles and the piston are disposed in parallel to each other.

* * * * *